US012590392B2

(12) United States Patent
Lin et al.

(10) Patent No.: US 12,590,392 B2
(45) Date of Patent: Mar. 31, 2026

(54) MANUFACTURING METHOD OF BREATHABLE AND WATERPROOF NON-WOVEN FABRIC

(71) Applicant: TAIWAN TEXTILE RESEARCH INSTITUTE, New Taipei City (TW)

(72) Inventors: Ying-Chi Lin, New Taipei City (TW); Wei-Hung Chen, New Taipei City (TW); Li-Chen Chu, New Taipei City (TW); Rih-Sheng Chiang, New Taipei City (TW)

(73) Assignee: TAIWAN TEXTILE RESEARCH INSTITUTE, New Taipei City (TW)

( * ) Notice: Subject to any disclaimer, the term of this patent is extended or adjusted under 35 U.S.C. 154(b) by 182 days.

(21) Appl. No.: 18/422,136

(22) Filed: Jan. 25, 2024

(65) Prior Publication Data

US 2024/0158968 A1 May 16, 2024

Related U.S. Application Data

(62) Division of application No. 17/539,298, filed on Dec. 1, 2021, now Pat. No. 11,952,690.

(30) Foreign Application Priority Data

| Dec. 9, 2020 | (TW) | ................................ | 109143509 |
| Dec. 9, 2020 | (TW) | ................................ | 109143510 |
| Dec. 9, 2020 | (TW) | ................................ | 109143511 |

(51) Int. Cl.
*D04H 3/033* (2012.01)
*B32B 5/02* (2006.01)
(Continued)

(52) U.S. Cl.
CPC ............. *D04H 3/033* (2013.01); *B32B 5/022* (2013.01); *B32B 5/265* (2021.05); *B32B 7/14* (2013.01);
(Continued)

(58) Field of Classification Search
CPC .. D04H 3/033; D06M 11/79; D06M 2200/12; B32B 5/265; B32B 5/022; B32B 7/14;
(Continued)

(56) References Cited

U.S. PATENT DOCUMENTS

| 6,797,655 B2 | 9/2004 | Rudisill |
| 10,486,404 B2 | 11/2019 | Jing |
(Continued)

FOREIGN PATENT DOCUMENTS

| CN | 101215410 A | 7/2008 |
| CN | 104760395 A | 7/2015 |
(Continued)

*Primary Examiner* — Jeremy R Pierce
(74) *Attorney, Agent, or Firm* — McClure, Qualey & Rodack, LLP

(57) ABSTRACT
A breathable and waterproof non-woven fabric is manufactured by a manufacturing method including the following steps. Performing a kneading process on 87 to 91 parts by weight of a polyester, 5 to 7 parts by weight of a water repellent, and 3 to 6 parts by weight of a flow promoter to form a mixture, in which the polyester has a melt index between 350 g/10 min and 1310 g/10 min at a temperature of 270° C., and the mixture has a melt index between 530 g/10 min and 1540 g/10 min at a temperature of 270° C. Performing a melt-blowing process on the mixture, such that the flow promoter is volatilized and a melt-blown fiber is formed, in which the melt-blown fiber has a fiber body and the water repellent disposed on the fiber body with a particle size (D90) between 350 nm and 450 nm.

5 Claims, 7 Drawing Sheets

(51) Int. Cl.
    *B32B 5/26*         (2006.01)
    *B32B 7/14*         (2006.01)
    *D06M 11/79*       (2006.01)

(52) U.S. Cl.
    CPC .......... *D06M 11/79* (2013.01); *B32B 2255/02* (2013.01); *B32B 2255/20* (2013.01); *B32B 2307/724* (2013.01); *B32B 2307/73* (2013.01); *D06M 2200/12* (2013.01)

(58) Field of Classification Search
    CPC ............ B32B 2255/20; B32B 2255/02; B32B 2307/73; B32B 2307/724
    See application file for complete search history.

(56)              References Cited

U.S. PATENT DOCUMENTS

| | | | |
|---|---|---|---|
| 2003/0181119 A1 | 9/2003 | Ishikawa et al. | |
| 2004/0127132 A1* | 7/2004 | Berman | B32B 27/08 |
| | | | 442/376 |
| 2006/0008651 A1 | 1/2006 | Day | |
| 2009/0305594 A1 | 12/2009 | He et al. | |
| 2013/0273300 A1 | 10/2013 | Baychar | |
| 2013/0344764 A1* | 12/2013 | He | D04H 3/033 |
| | | | 528/295.3 |
| 2016/0130411 A1* | 5/2016 | Alric | B32B 27/08 |
| | | | 428/447 |
| 2018/0313001 A1 | 11/2018 | Dempsey | |
| 2020/0123680 A1 | 4/2020 | Padron et al. | |

FOREIGN PATENT DOCUMENTS

| | | | | |
|---|---|---|---|---|
| CN | 106140556 A | 11/2016 | | |
| CN | 106671498 A | 5/2017 | | |
| CN | 107512033 A | 12/2017 | | |
| CN | 108893868 A | 11/2018 | | |
| CN | 109177370 A | 1/2019 | | |
| DE | 19642253 A1 | 8/1997 | | |
| EP | 3578712 A1 * | 12/2019 | ............... | C09K 3/18 |
| JP | 2001355173 A | 12/2001 | | |
| JP | 3987756 B2 | 10/2007 | | |
| TW | M534038 U | 12/2016 | | |
| TW | I571493 B | 2/2017 | | |
| TW | 201728274 A | 8/2017 | | |
| TW | I605880 B | 11/2017 | | |
| TW | I605950 B | 11/2017 | | |
| TW | 201815559 A | 5/2018 | | |
| TW | 202138652 A | 10/2021 | | |
| WO | 0186044 A1 | 11/2001 | | |
| WO | 2007024447 A1 | 3/2007 | | |

* cited by examiner

100

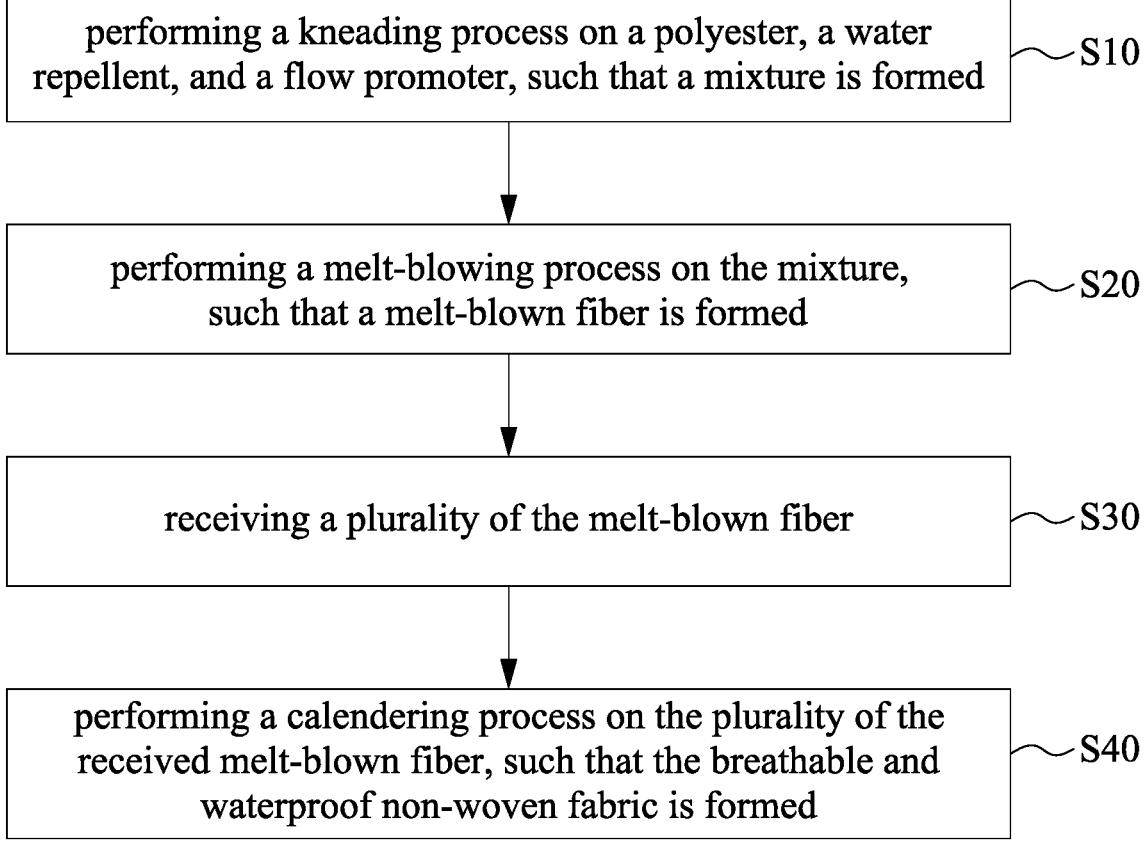

| performing a kneading process on a polyester, a water repellent, and a flow promoter, such that a mixture is formed | ~S10 |

| performing a melt-blowing process on the mixture, such that a melt-blown fiber is formed | ~S20 |

| receiving a plurality of the melt-blown fiber | ~S30 |

| performing a calendering process on the plurality of the received melt-blown fiber, such that the breathable and waterproof non-woven fabric is formed | ~S40 |

MANUFACTURING METHOD OF BREATHABLE AND WATERPROOF NON-WOVEN FABRIC

RELATED APPLICATION

This application is a Divisional Application of the U.S. application Ser. No. 17/539,298, filed Dec. 1, 2021, now issued as U.S. Pat. No. 11,952,690, which claims priority to Taiwan Application Serial Number 109143511, filed Dec. 9, 2020, Taiwan Application Serial Number 109143509, filed Dec. 9, 2020, and Taiwan Application Serial Number 109143510, filed Dec. 9, 2020, which are herein incorporated by reference.

BACKGROUND

Field of Invention

The present disclosure relates to a manufacturing method of a non-woven fabric, and particularly relates to a manufacturing method of a breathable and waterproof non-woven fabric.

Description of Related Art

In the textile industry, since non-woven fabrics can be formed without warp knitting, issues related to non-woven fabrics have gradually become the focus of development. In addition, since non-woven fabrics have the advantages of short process time, high output, low cost, and wide sources of its raw materials, they are suitable for applied in the consumer market. A broad definition of non-woven fabrics can be a cloth formed by pressure or by stickiness. However, the manufacturing process of the non-woven fabrics can be quite diverse, and as the manufacturing method changes, the characteristics of the non-woven fabrics change accordingly.

With the continuous development of the textile industry, non-woven fabrics with breathable and waterproof functions began to be developed in the industry. Generally, compared with the melt-blowing process, the non-woven fabric formed by the electrospinning process usually has finer fibers, and therefore has better air permeability and waterproofness. However, the production speed of the electrospinning process is slower than that of the melt-blowing process due to the limitation of the electrospinning equipment, and a large amount of organic solvent is needed. Therefore, how to manufacture a non-woven textile with good air permeability and waterproofness through the melt-blowing process is so far an important issue.

SUMMARY

The present disclosure provides a breathable and waterproof non-woven fabric and a manufacturing method of the breathable and waterproof non-woven fabric. The breathable and waterproof non-woven fabric disclosed in the present disclosure is manufactured by a melt-blowing process, and is provided with good water repellency and water pressure resistance. The present disclosure also provides a breathable and waterproof cloth fabricated by the aforementioned breathable and waterproof non-woven fabric and the aforementioned manufacturing method, in which the breathable and waterproof cloth has good air permeability and waterproofness.

According to some embodiments of the present disclosure, the manufacturing method of a breathable and waterproof non-woven fabric includes the following steps. Performing a kneading process on 87 to 91 parts by weight of a polyester, 5 to 7 parts by weight of a water repellent, and 3 to 6 parts by weight of a flow promote, such that a mixture is formed, in which the polyester has a melt index between 350 g/10 min and 1310 g/10 min at a temperature of 270° C., and the mixture has a melt index between 530 g/10 min and 1540 g/10 min at a temperature of 270° C. Performing a melt-blowing process on the mixture, such that the flow promoter is volatilized and a melt-blown fiber is formed, in which the melt-blown fiber has a fiber body and the water repellent, and the water repellent is disposed on the fiber body.

In some embodiments of the present disclosure, a temperature of the melt-blowing process is between 250° C. and 275° C.

In some embodiments of the present disclosure, the flow promoter includes 0.1 to 6.0 parts by weight of a slip agent and 0.1 to 6.0 parts by weight of a polyol.

In some embodiments of the present disclosure, the polyol includes ethylene glycol, propylene glycol, butylene glycol, polyethylene glycol, or combinations thereof.

In some embodiments of the present disclosure, the manufacturing method of the breathable and waterproof non-woven fabric further includes the following steps. Receiving a plurality of the melt-blown fiber. Performing a calendering process on the plurality of the received melt-blown fiber, such that the breathable and waterproof non-woven fabric is formed.

According to some other embodiments of the present disclosure, the breathable and waterproof non-woven fabric is manufactured by the aforementioned manufacturing method, in which the water repellent is disposed on a surface of the fiber body, and the water repellent has a particle size (D90) between 350 nm and 450 nm.

In some embodiments of the present disclosure, an average fiber diameter of the melt-blown fiber is between 600 nm and 1700 nm.

In some embodiments of the present disclosure, an average pore diameter of the breathable and waterproof non-woven fabric is between 1.5 μm and 2.0 μm.

In some embodiments of the present disclosure, the water repellent is attached to the surface of the fiber body and is prevented from penetrating into the fiber body.

In some embodiments of the present disclosure, the water repellent includes a silicon dioxide aerogel, and a specific surface area of the silicon dioxide aerogel is between 600 m²/g and 800 m²/g.

According to some other embodiments of the present disclosure, the breathable and waterproof cloth includes a breathable and waterproof non-woven fabric, a first adhesive layer, and a first base fabric. The breathable and waterproof non-woven fabric is manufactured by the aforementioned manufacturing method of the breathable and waterproof non-woven fabric, and has an average pore diameter between 1.5 μm and 2.0 μm. The breathable and waterproof non-woven fabric includes a plurality of melt-blown fibers, in which the melt-blown fibers have an average fiber diameter between 600 nm and 1700 nm. The first adhesive layer is disposed on a first surface of the breathable and waterproof non-woven fabric and has a plurality of adhesive dots. The first base fabric is disposed on the first surface of the breathable and waterproof non-woven fabric through the adhesive dots.

In some embodiments of the present disclosure, the adhesion dots are disposed on the first surface of the breathable and waterproof non-woven fabric at intervals, and a distribution density of the adhesion dots is between 8 pcs/mm² and 10 pcs/mm².

In some embodiments of the present disclosure, a diameter of each of the adhesion dots is between 90 μm and 110 μm.

In some embodiments of the present disclosure, a viscosity of the first adhesive layer at a temperature of 90° C. is between 8000 cP and 9000 cP.

In some embodiments of the present disclosure, the first base fabric is a woven fabric.

In some embodiments of the present disclosure, the breathable and waterproof cloth further includes a second adhesive layer and a second base fabric. The second adhesive layer is disposed on an entire surface of a second surface of the breathable and waterproof non-woven fabric. The second base fabric is disposed on the second surface of the breathable and waterproof non-woven fabric through the second adhesive layer, in which the second base fabric is a knitted fabric.

In some embodiments of the present disclosure, the water repellent has a particle size (D90) between 350 nm and 450 nm.

In some embodiments of the present disclosure, the water repellent includes a silicon dioxide aerogel, and a specific surface area of the silicon dioxide aerogel is between 600 m²/g and 800 m²/g.

In the aforementioned embodiments of the present disclosure, by adding the flow promoter in the manufacturing process of the breathable and waterproof non-woven fabric, the melt-blown fiber can be provided with small fiber fineness, such that the breathable and waterproof non-woven fabric has high fiber distribution uniformity and a small pore diameter. As such, the breathable and waterproof non-woven fabric can be provided with good water pressure resistance. On the other hand, by adding the water repellent in the manufacturing process of the breathable and waterproof non-woven fabric, the breathable and waterproof non-woven fabric can be provided with good water repellency, and since the water repellent is disposed on the surface of the fiber body with a suitable size, the water repellency of the water repellent can be exerted well and the breathable and waterproof non-woven fabric can provide good wearing comfort. In addition, the breathable and waterproof cloth of the present disclosure includes the breathable and waterproof non-woven fabric manufactured by the aforementioned manufacturing method and the base fabric disposed on the breathable and waterproof non-woven fabric through the first adhesive layer. Since the aforementioned manufacturing method can provide suitable fiber fineness and pore size to the breathable and waterproof non-woven fabric, the breathable and waterproof cloth can have good waterproofness. On the other hand, through the special configuration of the first adhesive layer, the breathable and waterproof cloth can have good air permeability.

BRIEF DESCRIPTION OF THE DRAWINGS

The disclosure can be more fully understood by reading the following detailed description of the embodiments, with reference made to the accompanying drawings as follows:

FIG. 2 is a flowchart illustrating a manufacturing method of a breathable and waterproof non-woven fabric according to some embodiments of the present disclosure;

DETAILED DESCRIPTION

Figure 1:
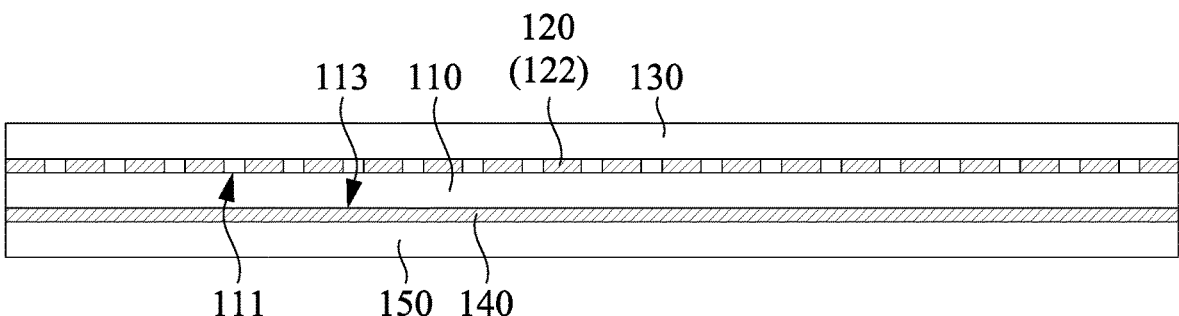
FIG. 1 is a schematic side view illustrating a breathable and waterproof cloth according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides a breathable and waterproof non-woven fabric and a manufacturing method thereof. In the manufacturing method of the breathable and waterproof non-woven fabric, by adding a flow promoter and a water repellent, the breathable and waterproof non-woven fabric can be provided with good water repellency and good water pressure resistance. On the other hand, since the water repellent is disposed on a surface of the fiber body with a suitable size, the water repellency of the water repellent can be exerted well and the breathable and waterproof non-woven fabric can provide good wearing comfort. The present disclosure also provides a breathable and waterproof cloth which includes the breathable and waterproof non-woven fabric manufactured by the aforementioned manufacturing method and a base fabric disposed on the breathable and waterproof non-woven fabric through the first adhesive layer. Since the manufacturing method can provide suitable fiber fineness and pore size to the breathable and waterproof non-woven fabric, the breathable and waterproof cloth can have good waterproofness. Furthermore, through the special configuration of the first adhesive layer, the breathable and waterproof cloth can have good air permeability. In the following description, the description will be mainly on the breathable and waterproof cloth.

FIG. 1 is a schematic side view illustrating a breathable and waterproof cloth 100 according to some embodiments of the present disclosure. The breathable and waterproof cloth 100 includes a breathable and waterproof non-woven fabric 110, a first adhesive layer 120, and a first base fabric 130. The breathable and waterproof non-woven fabric 110 is manufactured by a melt-blowing process and includes melt-blown fibers, in which the melt-blown fibers have an average fiber diameter between 600 nm and 1700 nm (i.e., the melt-blown fibers of the present disclosure are micro-nanometer grade melt-blown fibers). In addition, the breathable and waterproof non-woven fabric 110 has an average pore diameter between 1.5 μm and 2.0 μm. Based on the pore size of the breathable and waterproof non-woven fabric 110 and the fiber fineness of the melt-blown fibers therein, the breathable and waterproof cloth 100 may have good waterproofness. Furthermore, the first adhesive layer 120 is disposed on a first surface 111 of the breathable and waterproof non-woven fabric 110 and has a plurality of adhesive dots 122. Based on the configuration of the adhesion points 122, the breathable and waterproof cloth 100 may have good air permeability. Moreover, the first base fabric 130 is disposed on the first surface 111 of the breathable and waterproof non-woven fabric 110 through the adhesion points 122.

The breathable and waterproof non-woven fabric 110 of the present disclosure is manufactured by the melt-blowing process. For details, please refer to FIG. 2, which is a flowchart illustrating a manufacturing method of a breathable and waterproof non-woven fabric 110 according to some embodiments of the present disclosure. The manufacturing method of the breathable and waterproof non-woven fabric 110 includes steps S10, S20, S30, and S40. In step S10, a kneading process is performed on a polyester, a water repellent, and a flow promoter, such that a mixture is formed. In step S20, a melt-blowing process is performed on the mixture, such that a melt-blown fiber is formed. In step S30, a plurality of the melt-blown fiber is received. In step S40, a calendering process is performed on the plurality of the received melt-blown fiber, such that the breathable and waterproof non-woven fabric 110 of the present disclosure is formed. In the following description, the aforementioned steps will further be explained. It should be noted that although polyester is used as the main component of the melt-blown fiber in the following description, the main component of the melt-blown fiber in the present disclosure may also include materials such as polypropylene or nylon.

Firstly, step S10 is proceeded to uniformly mix 87 parts by weight to 91 parts by weight of the polyester, 5 parts by weight to 7 parts by weight of the water repellent, and 3 parts by weight to 6 parts by weight of the flow promoter, and the kneading process is performed, such that the mixture is formed. The mixture made by mixing the above reagents has a melt index (MI) between 530 g/10 min and 1540 g/10 min at a temperature of 270° C., such that the mixture can be provided with good fluidity during the subsequent melt-blowing process, and the breathable and waterproof non-woven fabric 110 is further provided with good water pressure resistance. In some embodiments, a temperature of the kneading process may be between 235° C. and 245° C.

The polyester disclosed in the present disclosure is used as the main raw material of the melt-blown fiber in the breathable and waterproof non-woven fabric 110, that is, the melt-blown fiber includes polyester. The polyester has a melt index between 350 g/10 min and 1310 g/10 min at a temperature of 270° C., so as to provide certain fluidity for the mixture during the subsequent melt-blowing process. In detail, different types of polyester may have different ranges of melt index. For example, a first type of polyester may have a melt index between 350 g/10 min and 450 g/10 min at a temperature of 270° C., while a second type of polyester may have a melt index between 1210 g/10 min and 1310 g/10 min at a temperature of 270° C. In some embodiments, the polyester may be, for example, polyethylene terephthalate (PET), polytrimethylene terephthalate (PPT), or polybutylene terephthalate (PBT).

The water repellent of the present disclosure is used to provide good water repellency for the breathable and waterproof non-woven fabric 110. The water repellent has a particle size (D90) between 350 nm and 450 nm to be uniformly dispersed in the mixture during the kneading process, so as to provide the breathable and waterproof non-woven fabric 110 with good water repellency and wearing comfort to the user. In detail, if the particle size of the water repellent is greater than 450 nm, the water repellent may not be uniformly dispersed in the mixture, which may be difficult for the water repellent to provide good water repellency, causing the breathable and waterproof non-woven fabric 110 have significant graininess, thereby failing to provide the user with wearing comfort. In some embodiments, the water repellent may include a silicon dioxide or silicon dioxide aerogel, and on a microscopic scale, a shape of the silicon dioxide or silicon dioxide aerogel may be, a spherical shape, thereby having a low surface energy to provide good water repellency. In some embodiments, a specific surface area of the silicon dioxide or silicon dioxide aerogel can be between 600 m²/g and 800 m²/g, which is beneficial for strengthening its low density, high porosity, and high hydrophobicity characteristics, thereby providing the breathable and waterproof non-woven fabric 110 with good water repellency.

The flow promoter of the present disclosure is used to provide the breathable and waterproof non-woven fabric 110 with good water pressure resistance, such that the breathable and waterproof cloth 100 have good waterproofness. In detail, the flow promoter can make the aforementioned mixture have a lower melt index relative to the polyester, that is, the mixture can have better fluidity compared to the polyester, such that the melt-blown fiber formed by the mixture during the subsequent melt-blowing process can have small fiber fineness. Accordingly, the breathable and waterproof non-woven fabric 110 is provided with a small pore diameter to have good water pressure resistance. As mentioned above, the mixture has a melt index between 530 g/10 min and 1540 g/10 min at a temperature of 270° C. In more detail, when the aforementioned first type of polyester is used to form the mixture, the mixture may have a melt index between 530 g/10 min and 630 g/10 min at a temperature of 270° C., and when the aforementioned second type of polyester is used to forms the mixture, the mixture may have a melt index between 1440 g/10 min and 1540 g/10 min at a temperature of 270° C.

In some embodiments, the flow promoter may include 0.1 to 6.0 parts by weight of a slip agent and 0.1 to 6.0 parts by weight of a polyol. The slip agent and the polyol can provide the mixture with good fluidity, and the polyol can improve the compatibility between the slip agent and the polyester. In some embodiments, the polyol may include ethylene glycol, propylene glycol, butylene glycol, polyethylene glycol, or combinations thereof. In some embodiments, the flow promoter is easy to volatilize when the temperature is above 250° C., and can stably exist in the mixture when the temperature is below 250° C. Based on this characteristic, the flow promoter can stably exist in the mixture during the kneading process (which is under a temperature less than 250° C.), such that the mixture is provided with good fluidity, and the flow promoter will volatilize during the subsequent melt-blowing process (which is under a temperature greater than or equal to 250° C.) to avoid being left over in the breathable and waterproof non-woven fabric 110.

Figure 3:
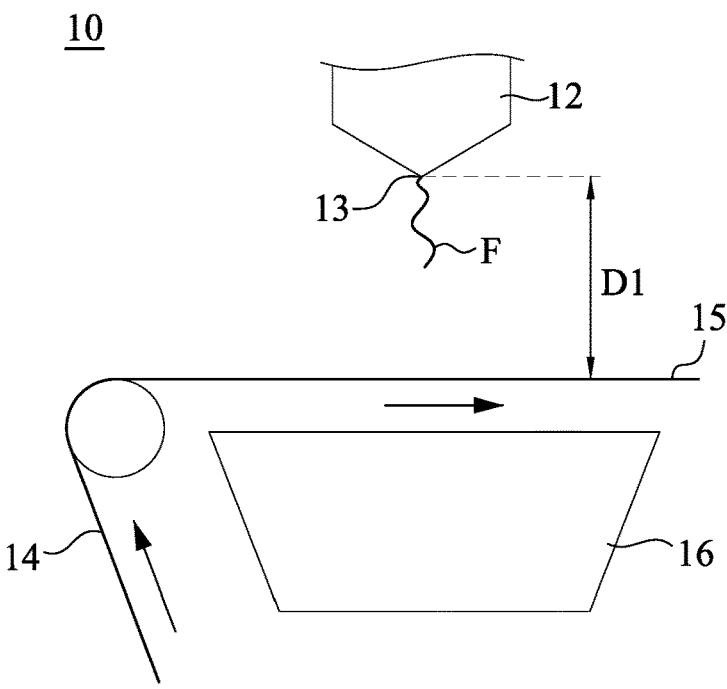
FIG. 3 is a schematic side view illustrating a textile equipment according to some embodiments of the present disclosure.

Next, steps S20 and S30 are proceeded to perform a melt-blowing process on the aforementioned mixture to form the melt-blown fibers, and to receive the melt-blown fibers. Please refer to FIG. 3, which is a schematic side view illustrating a textile equipment 10 according to some embodiments of the present disclosure. In some embodiments, the textile equipment 10 may include a melt-blowing device 12 and a collecting device 14, in which the melt-blowing device 12 may have a plurality of ejecting holes 13, and the collecting device 14 may have a receiving net 15. In

Figure 4:
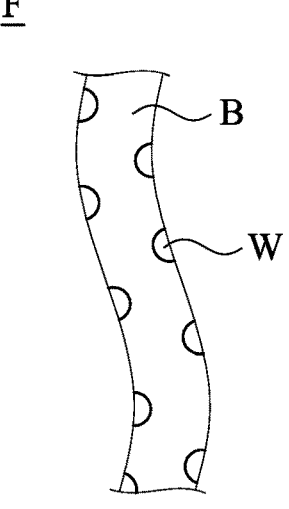
FIG. 4 is a schematic partial enlarged view illustrating the melt-blown fiber shown in FIG. 3.

7 some embodiments, the collecting device 14 may further have a suction element 16 for providing suction to guide the melt-blown fibers F to the receiving net 15. During the melt-blowing process, the flow promoter in the mixture will volatilize, and the remaining polyester and water repellent can be ejected through the ejecting hole 13 of the melt-blowing device 10 to form the melt-blown fibers F, and the melt-blown fibers F can then be received and collected by the receiving net 15 of the collecting device 14. Please refer to FIG. 4, which is a schematic partial enlarged view illustrating the melt-blown fiber F shown in FIG. 3. The melt-blown fiber F ejected by the melt-blown device 10 has a fiber body B and a water repellent W, and the water repellent W is disposed on the fiber body B. In some embodiments, the water repellent W may be attached to the surface of the fiber body B. In preferred embodiments, the water repellent W can only be attached to the surface of the fiber body B, and is prevented from penetrating into the fiber body B. It should be noted that the "preventing from permeating into the fiber body B" in the present disclosure refers to "embedded in the surface of the fiber body B and partially exposed from the surface of the fiber body B" (as shown in FIG. 4).

Please refer back to FIG. 3. In some embodiments, a temperature of the melt-blowing process may be between 250° C. and 275° C., so as to ensure that the mixture has sufficient fluidity during the melt-blowing process and ensure that the flow promoter is completely volatilized. In some embodiments, based on the good fluidity of the mixture, the pore diameter of the ejecting hole 13 can be configured to be about 0.2 mm, and a ratio of the length to the pore diameter of the ejecting hole 13 can be configured to be about 20, thereby helping to form melt-blown fibers F with small fiber fineness. In some embodiments, an average fiber diameter of the melt-blown fiber F may be between 600 nm and 1700 nm, such that the formed breathable and waterproof non-woven fabric 110 has high fiber distribution uniformity and a small pore diameter, thereby being provided with good water pressure resistance. For example, the breathable and waterproof non-woven fabric 110 of the present disclosure can withstand a water pressure ranging from 6000 mmH₂O to 8000 mmH₂O.

In some embodiments, the operating parameters of the melt-blowing process can be adjusted, such that the formed melt-blown fiber F has small fiber fineness. More specifically, the melt-blown fiber F can have small fiber fineness by adjusting the air temperature, air pressure, air flow, fiber throughput, and distance D1 between the ejecting hole 13 and the receiving net 15 during the melt-blowing process. The specific ranges of the operating parameters of the melt-blowing process are shown in Table 1.

TABLE 1

| operating parameters of the melt-blowing process | | | | |
|---|---|---|---|---|
| air temperature (° C.) | air pressure (MPa) | air flow (m³/min) | fiber throughput (g/(hole*min)) | distance D1 (cm) |
| 250-280 | 0.008-0.034 | 3.0-7.0 | 0.05-0.20 | 4-10 |

Subsequently, step S40 is proceeded to perform a calendering process on the melt-blown fibers F that have been received to form the breathable and waterproof non-woven fabric 110. In some embodiments, the breathable and waterproof non-woven fabric 110 formed by the calendering process may have an average pore diameter between 1.5 μm and 2.0 μm, so as to provide the breathable and waterproof non-woven fabric 110 with good water pressure resistance, such that the breathable and waterproof cloth 100 can have good waterproofness. In some embodiments, the operating parameters of the calendering process can be adjusted, such that the formed breathable and waterproof non-woven fabric 110 has a small pore diameter. More specifically, the breathable and waterproof non-woven fabric 110 can have a small pore diameter by adjusting the temperature of the upper wheel, temperature of the lower wheel, wheel gap, line pressure, and line speed of the calendering process. The specific ranges of the operating parameters of the calendering process are shown in Table 2.

TABLE 2

| operating parameters of the calendering process | | | | |
|---|---|---|---|---|
| temperature of upper wheel (° C.) | temperature of lower wheel (° C.) | wheel gap (kg/cm) | line pressure (mm) | line speed (m/min) |
| 25-160 | 25~160 | <0.1 | 0~100 | 1.0-2.5 |

Figure 5:
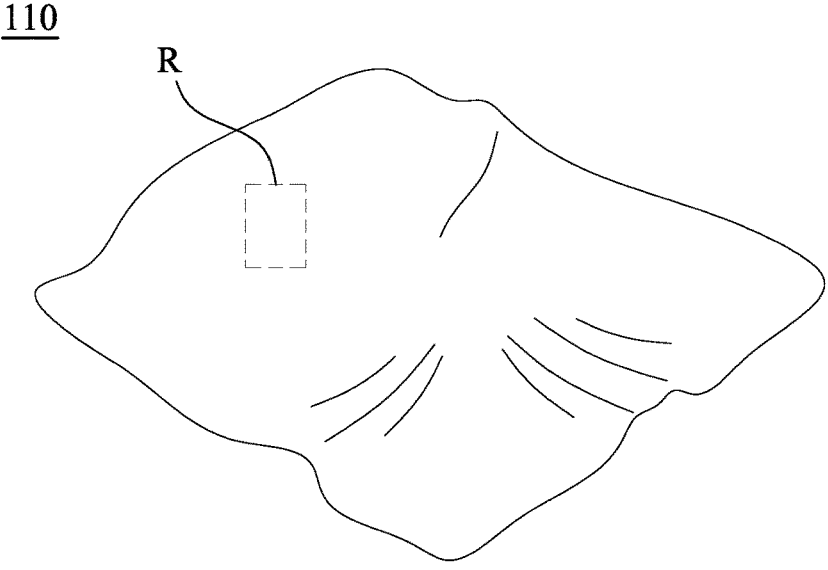
FIG. 5 is a schematic perspective view illustrating a breathable and waterproof non-woven fabric according to some embodiments of the present disclosure.
Figure 6:
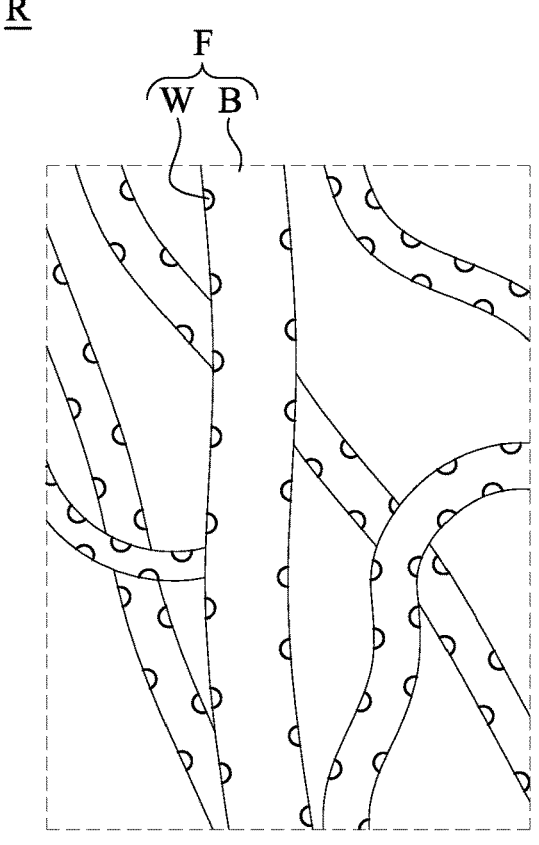
FIG. 6 is a schematic partial enlarged view illustrating the area R of the breathable and waterproof non-woven fabric shown in FIG. 5.

After the above steps S10 to S40 are completed, the breathable and waterproof non-woven fabric 110 of the present disclosure can be formed. Please refer to FIG. 5 and FIG. 6, in which FIG. 5 is a schematic perspective view illustrating a breathable and waterproof non-woven fabric 110 according to some embodiments of the present disclosure, and FIG. 6 is a schematic partial enlarged view illustrating the area R of the breathable and waterproof non-woven fabric 110 shown in FIG. 5. As a whole, the breathable and waterproof non-woven fabric 110 includes a plurality of melt-blown fibers F, in which each melt-blown fiber F has a fiber body B and a water repellent W, and the water repellent W is disposed on the surface of the fiber body B. Since the water repellent W is disposed on the surface of the fiber body B with a suitable size, the water repellency of the water repellent W can be exerted well and the breathable and waterproof non-woven fabric 110 can provide good wearing comfort. In addition, since the melt-blown fiber F has small fiber fineness, the breathable and waterproof non-woven fabric 110 can have high fiber distribution uniformity. In addition, since the breathable and waterproof non-woven fabric 110 has a small pore diameter, the breathable and waterproof non-woven fabric 110 can be provided with good water pressure resistance.

In the following descriptions, features and effects of the present disclosure will be described more specifically with reference to some breathable and waterproof non-woven fabrics of some embodiments and a non-woven fabric of a comparative example. The related description of the breathable and waterproof non-woven fabric of each embodiment and the non-woven fabric of the comparative example are shown in Table 3.

TABLE 3

| | Amount of each reagent added during the kneading process (parts by weight) | | | melt index of polyester (g/10 min) | weight of non-woven fabric (gsm) |
|---|---|---|---|---|---|
| | polyester | water repellent | flow promoter | | |
| comparative example 1 | 100 | 0 | 0 | 350 | 40 |
| embodiment 1 | 89 | 6 | 5 | 350 | 40 |

9

TABLE 3-continued

| | Amount of each reagent added during the kneading process (parts by weight) | | | melt index of polyester (g/10 min) | weight of non-woven fabric (gsm) |
|---|---|---|---|---|---|
| | polyester | water repellent | flow promoter | | |
| embodiment 2 | 89 | 6 | 5 | 1310 | 40 |
| embodiment 3 | 89 | 6 | 5 | 1310 | 25 |
| embodiment 4 | 89 | 6 | 5 | 1310 | 15 |

In this experiment, the melt index is measured for the mixture (i.e., the mixture formed by the polyester, water repellent, and flow promoter through the kneading process) used to form each embodiment and each comparative example, and the fiber fineness, pore diameter, and water repellency are measured for each embodiment and the comparative example. It should be understood that the melt index is measured by the test method ASTM D1238, the fiber fineness is measured by a scanning electron microscope (SEM), the pore diameter is measured by a porosimeter (purchased from Porous Material Inc.), and the water repellency is measured by the test method ASTM-D583-54. The measurement results are shown in Table 4.

TABLE 4

| | melt index of mixture (g/10 min) | average fiber diameter of melt-blown fiber (nm) | average pore diameter of non-woven fabric (μm) | water repellency of non-woven fabric |
|---|---|---|---|---|
| comparative example 1 | 350 | 2000 | — | 0 |
| embodiment 1 | 530 | 1700 | 1.6 | 90~100 |
| embodiment 2 | 1540 | 1270 | 1.65 | 90~100 |
| embodiment 3 | 1540 | 740 | 1.86 | 90~100 |
| embodiment 4 | 1540 | 780 | 1.83 | 90~100 |

It can be seen from the measurement results that when the flow promoter is added during the kneading process, the mixture of the polyester, water repellent, and flow promoter can be made to have a higher melt index than that of polyester, thereby having a higher fluidity. Therefore, the melt-blown fibers with small fiber fineness (less than 2000 nm) and the breathable and waterproof non-woven fabrics with small pore diameters (less than 2 μm) can be formed. On the other hand, when the water repellent is added during the kneading process, the water repellency of the breathable and waterproof non-woven fabric can be between 90 and 100, showing good water repellency.

According to the aforementioned embodiments of the present disclosure, by adding the flow promoter in the manufacturing process of the breathable and waterproof non-woven fabric, the melt-blown fiber can be provided with small fiber fineness, such that the breathable and waterproof non-woven fabric has high fiber distribution uniformity and a small pore diameter. As such, the breathable and waterproof non-woven fabric can be provided with good water pressure resistance. On the other hand, by adding the water repellent in the manufacturing process of the breathable and waterproof non-woven fabric, the breathable and waterproof non-woven fabric can be provided with good water repellency, and since the water repellent is disposed on the surface of the fiber body with a suitable size, the water repellency of the water repellent can be exerted well and the breathable and waterproof non-woven fabric can provide good wearing comfort.

10

Figure 7:
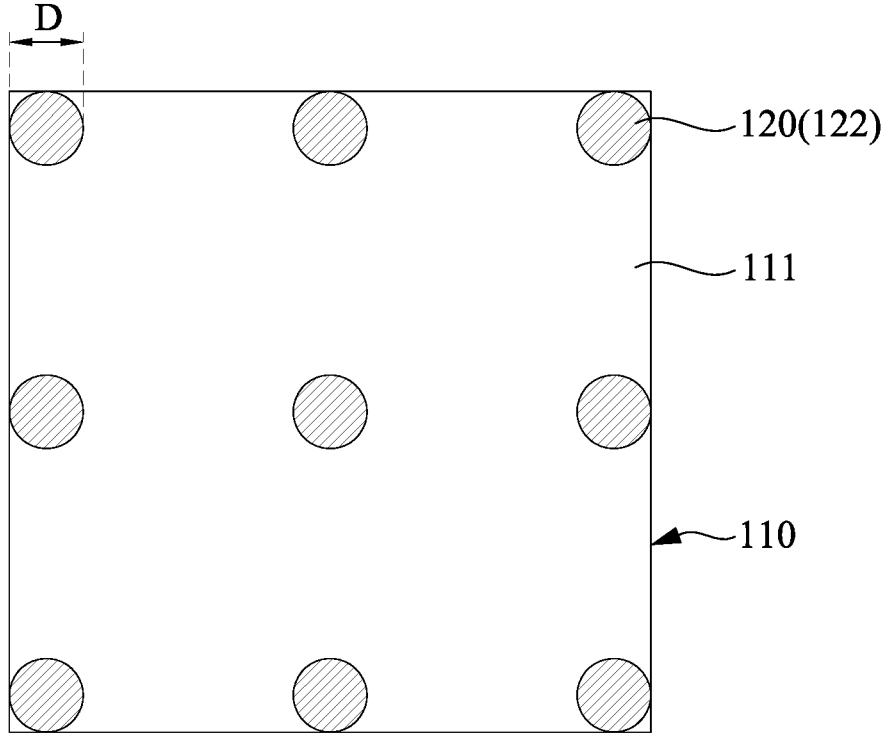
FIG. 7 is a schematic view illustrating a configuration of the first adhesive layer of the breathable and waterproof cloth shown in FIG. 1.

FIG. 7 is a schematic view illustrating a configuration of the first adhesive layer 120 of the breathable and waterproof cloth 100 shown in FIG. 1. Please refer to FIG. 1 and FIG. 7, the first adhesive layer 120 is disposed on the first surface 111 of the breathable and waterproof non-woven fabric 110 to fix the first base fabric 130 on the first surface 111 of the breathable and waterproof non-woven fabric 110. In some embodiments, the first adhesive layer 120 may be, for example, a moisture-curing reactive hot-melt adhesive to provide a strong adhesive force and a high curing rate. In some embodiments, the first adhesive layer 120 can be formed on the first surface 111 of the breathable and waterproof non-woven fabric 110 through dispensing when the temperature is between 110° C. and 130° C., and a viscosity of the first adhesive layer 120 at a temperature of 90° C. is between 8000 cP and 9000 cP. Thereby, the first adhesive layer 120 can be easily transferred to the breathable and waterproof non-woven fabric 110, and the forming position of the first adhesive layer 120 can be well controlled. In detail, if the viscosity of the first adhesive layer 120 at a temperature of 90° C. is less than 8000 cP, it may be difficult to control the forming position of the first adhesive layer 120 due to its high fluidity; if the viscosity of the first adhesive layer 120 at a temperature of 90° C. is greater than 9000 cP, the first adhesive layer 120 may be too viscous to be transferred to the breathable and waterproof non-woven fabric 110.

The first adhesive layer 120 is disposed on the first surface 111 of the breathable and waterproof non-woven fabric 110, and has a plurality of adhesive dots 122. In some embodiments, the adhesion dots 122 may, for example, be disposed on the first surface 111 of the breathable and waterproof non-woven fabric 110 at intervals, such that the breathable and waterproof cloth 100 has good air permeability. In some preferred embodiments, the adhesion dots 122 may be, for example, equidistantly disposed on the first surface 111 of the breathable and waterproof non-woven fabric 110, such that the breathable and waterproof cloth 100 has good flatness and uniform air permeability. In some embodiments, a top-viewed shape (i.e., the shape viewed from the viewing angle of FIG. 7) of the adhesion dot 122 may be, for example, a rectangle, a diamond, a circle, an ellipse, a triangle, a trapezoid, or other suitable shapes.

On the other hand, the distribution density and the size of the adhesion dots 122 can also affect the air permeability of the breathable waterproof cloth 100. In some embodiments, a distribution density of the adhesion dots 122 may be between 8 pcs/mm$^2$ and 10 pcs/mm$^2$, and when the circular adhesion dots 122 are taken as an example, a diameter D of each adhesion dot 122 may be between 90 μm and 110 μm. In detail, if the distribution density of the adhesion dots 122 is greater than 10 pcs/mm$^2$ and/or the diameter D of each adhesion dot 122 is greater than 110 μm, the air permeability of the breathable waterproof cloth 100 may be insufficient; if the distribution density of the adhesion dots 122 is less than 5 pcs/mm$^2$ and/or the diameter D of each adhesion dot 122 is less than 90 μm, it may cause insufficient adhesion of the first adhesion layer 120, thereby affecting the stability of the breathable waterproof cloth 100.

The first base fabric 130 is disposed on the first surface 111 of the breathable and waterproof non-woven fabric 110 through the adhesion dots 122 of the first adhesive layer 120. In some embodiments, since the configuration of the first adhesive layer 120 is in the form of dots (i.e., the adhesive dots 122), the first base fabric 130 may be, for example, a woven fabric with high density. When the breathable and waterproof cloth 100 is applied to the field of wearing clothing, the first base fabric 130 may be configured as an outer fabric of the clothing.

It is supplemented that the present disclosure also provides a bonding device and a bonding method for bonding the breathable and waterproof non-woven fabric 110, the first adhesive layer 120, and the first base fabric 130. Through the rotation and matching of the wheels in the bonding device, the breathable and waterproof non-woven fabric 110 and the first base fabric 130 can go forward in the bonding device and be attached to each other. On the other hand, by selecting an adhesive with an appropriate viscosity, the transfer of the adhesive between the wheels can be facilitated, thereby enhancing the convenience of the bonding process. The breathable and waterproof cloth 100 fabricated by the bonding device and bonding method of the present disclosure can have good air permeability, good waterproofness, and good peeling strength.

Figure 8:
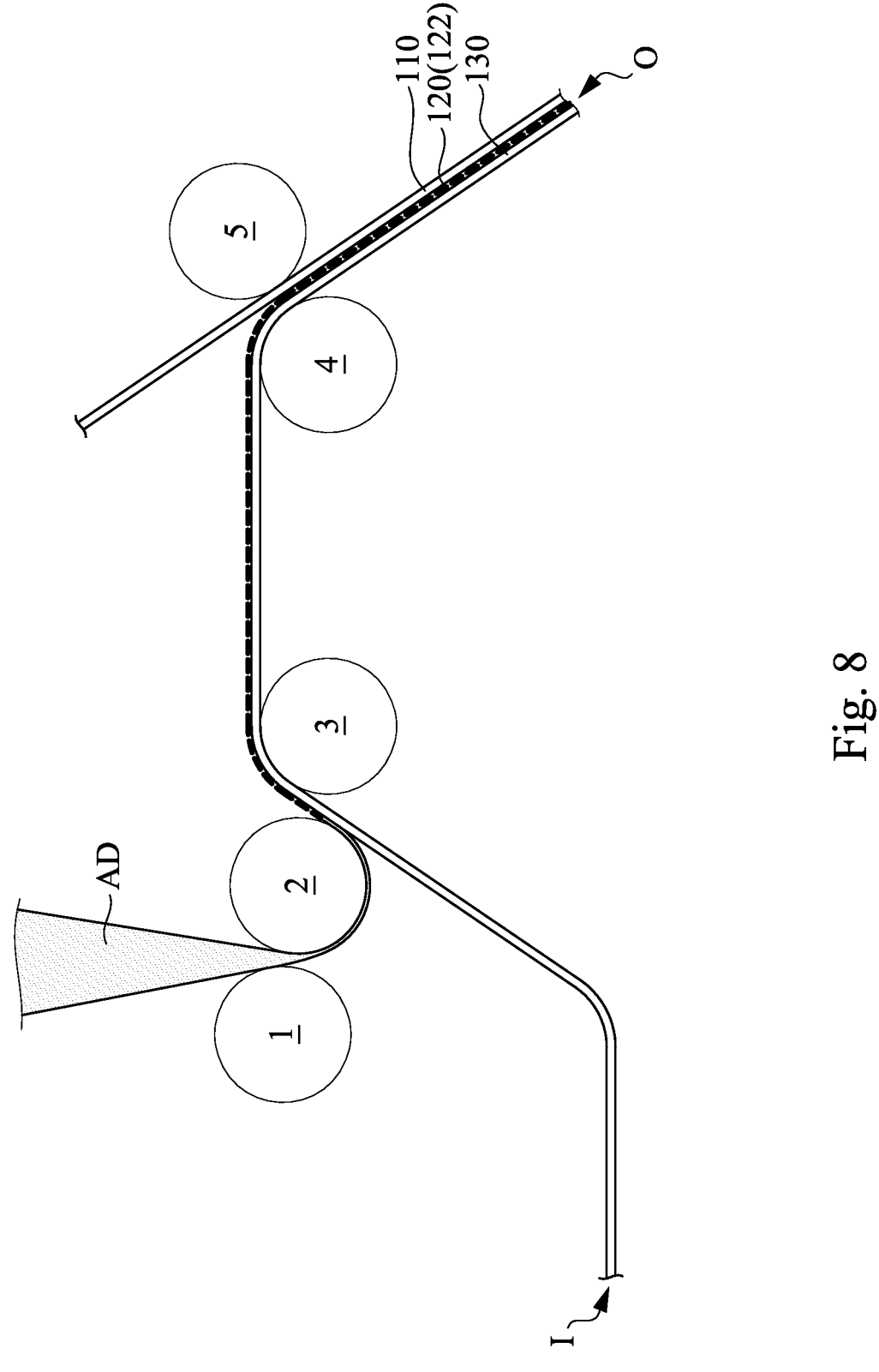
FIG. 8 is a schematic side view illustrating a bonding device according to some embodiments of the present disclosure.

Please refer to FIG. 8, which is a schematic side view illustrating a bonding device 1000 according to some embodiments of the present disclosure. The bonding device 1000 includes a coating wheel 1, a dispensing wheel 2, a cloth feeding wheel 3, a first pressing wheel 4, and a second pressing wheel 5, and the coating wheel 1, the dispensing wheel 2, the cloth feeding wheel 3, the first pressing wheel 4, and the second pressing wheel 5 are arranged adjacently and sequentially from near the entrance I of the bonding device 1000 to near the exit O. More specifically, the dispensing wheel 2 is adjacent to the coating wheel 1, the cloth feeding wheel 3 is adjacent to the dispensing wheel 2, the first pressing wheel 4 is adjacent to the cloth feeding wheel 3, and the second pressing wheel 5 is adjacent to the first pressing wheel 4. Except for the coating wheel 1, each of the aforementioned wheels has its own rotation direction. The cloth feeding wheel 3 and the first pressing wheel 4 have a first rotation direction, and the dispensing wheel 2 and the second pressing wheel 5 have a second rotation direction. In some embodiments, the first rotation direction may be different from the second rotation direction, for example, the first rotation direction may be a clockwise direction, and the second rotation direction may be a counterclockwise direction. In some embodiments, each wheel can be driven by a different and independently operating motor. On the other hand, the coating wheel 1 has a scraper (not shown) disposed thereon, and a wheel distance between the first pressing wheel 4 and the second pressing wheel 5 is 50% to 70% of a thickness of the semi-finished product including the breathable and waterproof non-woven fabric 110, the first adhesive layer 120, and the first base fabric 130.

Figure 9:
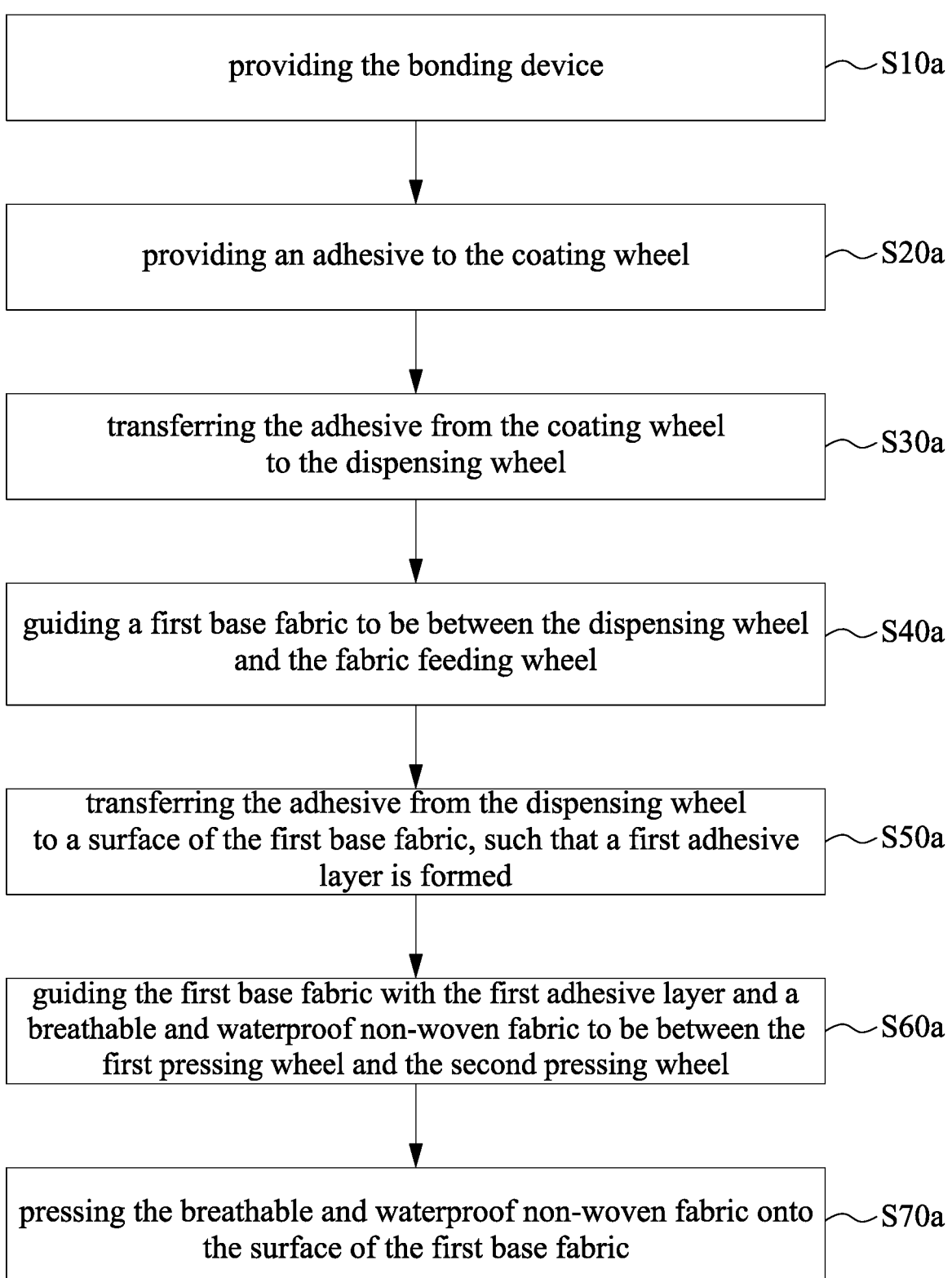
FIG. 9 is a flowchart illustrating a bonding method according to some embodiments of the present disclosure.

For clarity and convenience of description, the bonding device 1000 and the bonding method will be described together in the present disclosure. In detail, please refer to FIG. 9, which is a flowchart illustrating a bonding method according to some embodiments of the present disclosure. The bonding method may include step S10*a* to step S70*a*. In step S10*a*, the bonding device is provided. In step S20*a*, an adhesive is provided to the coating wheel. In step S30*a*, the adhesive is transferred from the coating wheel to the dispensing wheel. In step S40*a*, a first base fabric is guided between the dispensing wheel and the fabric feeding wheel. In step S50*a*, the adhesive is transferred from the dispensing wheel to a surface of the first base fabric, such that a first adhesive layer is formed. In step S60*a*, the first base fabric with the first adhesive layer and a breathable and waterproof non-woven fabric are guided between the first pressing wheel and the second pressing wheel. In step S70*a*, the breathable and waterproof non-woven fabric is pressed onto the surface of the first base fabric. In the following description, FIG. 8 and FIG. 9 will be used to further explain the above steps.

Firstly, step S10*a* is proceeded to provide the bonding device 1000, in which the bonding device 1000 may include the coating wheel 1, the dispensing wheel 2, the cloth feeding wheel 3, the first pressing wheel 4, and the second pressing wheel 5 arranged adjacently in sequence.

Next, step S20*a* is proceeded to provide the adhesive AD to the coating wheel 1. In detail, the coating wheel 1 can carry the adhesive AD through the scraper arranged on its wheel surface. In some embodiments, a bearing capacity of the adhesive AD on the coating wheel 1 can be controlled by changing the shape, width, and thickness of the scraper. In some embodiments, the adhesive AD can be introduced into the spacing between the coating wheel 1 and the dispensing wheel 2. Therefore, the amount of adhesive AD can be controlled by adjusting the distance between the coating wheel 1 and the dispensing wheel 2. It should be understood that the "spacing between the coating wheel 1 and the dispensing wheel 2" herein refers to the "spacing between the scraper of the coating wheel 1 and the dispensing wheel 2". In some embodiments, the distance between the coating wheel 1 and the dispensing wheel 2 may be between 50 mm and 100 mm, such that an appropriate amount of adhesive AD can be loaded. In detail, if the distance between the coating wheel 1 and the dispensing wheel 2 is less than 50 mm, the breathable and waterproof cloth 100 may easily peel off due to the insufficient amount of adhesive AD; if the distance between the coating wheel 1 and the dispensing wheel 2 is greater than 100 mm, the adhesive AD may leak due to the excessive amount of adhesive AD. In some embodiments, the wheel temperature of the coating wheel 1 and the dispensing wheel 2 can be between 90° C. and 130° C., such that the adhesive AD carried thereon has proper fluidity.

As mentioned above, the adhesive AD used in the present disclosure has a viscosity between 8000 cP and 9000 cP at a temperature of 90° C., such that the adhesive AD has appropriate fluidity and is beneficial to be transferred between the wheels (e.g., the coating wheel 1 and the dispensing wheel 2). In detail, if the viscosity of the adhesive AD at a temperature of 90° C. is greater than 9000 cP, the adhesive AD may excessively adhere to the surfaces of the wheels due to its insufficient fluidity, and thus cannot be transferred by the wheels; if the viscosity of AD at a temperature of 90° C. is less than 8000 cP, the adhesive AD may not easily adhere to the surfaces of the wheels due to its high fluidity, and thus cannot be transferred by the wheels.

Subsequently, step S30*a* is proceeded to transfer the adhesive AD from the coating wheel 1 to the dispensing wheel 2. As mentioned above, the coating wheel 1 is fixed and does not rotate, and the dispensing wheel 2 has a second rotation direction. By rotating the coating wheel 1 and the dispensing wheel 2 relative to each other, the coating wheel 1 can transfer the adhesive AD to the dispensing wheel 2. In some embodiments, the coating wheel 1 can transfer the adhesive AD to the dispensing wheel 2 in a scraping manner through its scraper. In some embodiments, the dispensing wheel 2 may have a three-dimensional pattern arranged on its wheel surface, such that the adhesive AD is attached to the three-dimensional pattern during the transfer to the dispensing wheel 2. In this way, the distribution density of the adhesive AD on the dispensing wheel 2 can be controlled through the distribution density of the three-dimensional pattern, and attachment amount of the adhesive AD on the dispensing wheel 2 can be controlled through the concave/ convex depth of the three-dimensional pattern. In some embodiments, a wheel temperature of the dispensing wheel 2 can be between 90° C. and 130° C., such that the adhesive AD carried on the dispensing wheel 2 has appropriate fluidity. On the other hand, the aforementioned distance between the coating wheel 1 and the dispensing wheel 2 may affect the thickness of the adhesive AD attached to the dispensing wheel 2. Specifically, the distance between the coating wheel 1 and the dispensing wheel 2 may be equal to a thickness of the adhesive AD attached to the dispensing wheel 2.

Next, step S40a is proceeded to guide the first base fabric 130 to be between the dispensing wheel 2 and the cloth feeding wheel 3, such that the first base fabric 130 passes through the gap between the dispensing wheel 2 and the cloth feeding wheel 3. In some embodiments, the first base fabric 130 may be, for example, a woven fabric, and when the breathable and waterproof cloth 100 is applied to the field of wearing clothing, the first base fabric 130 may be configured as an outer fabric of the clothing.

Subsequently, step S50a is proceeded to transfer the adhesive AD from the dispensing wheel 2 to the surface of the first base fabric 130 to form the first adhesive layer 120. As mentioned above, the dispensing wheel 2 has the second rotation direction, and the cloth feeding wheel 3 has the first rotation direction. By making the dispensing wheel 2 and the cloth feeding wheel 3 have different rotation directions, the dispensing wheel 2 can transfer the adhesive AD that moves between the dispensing wheel 2 and the cloth feeding wheel 3 to the surface of the first base fabric 130. In other words, the cloth feeding wheel 3 and the dispensing wheel 2 can jointly transfer the adhesive AD to the surface of the first base fabric 130. The first adhesive layer 120 includes a plurality of adhesive dots 122, and the distribution density of the adhesive dots 122 on the first base fabric 130 can be controlled by adjusting the relative rotation speed of the dispensing wheel 2 and the cloth feeding wheel 3. In some embodiments, the rotation speed of the dispensing wheel 2 is 5% to 300% of the rotation speed of the cloth feeding wheel 3, such that the adhesion dots 122 are arranged on the surface of the first base fabric 130 with an appropriate distribution density. In more detail, if the rotation speed of the dispensing wheel 2 is greater than 300% of the rotation speed of the cloth feeding wheel 3, the distribution density of the adhesion dots 122 on the first base fabric 130 may be too high, thereby affecting the air permeability of the breathable waterproof cloth 100 or causing adhesion leakage; if the rotation speed of the dispensing wheel 2 is less than 5% of the rotation speed of the cloth feeding wheel 3, the distribution density of the adhesion dots 122 on the first base fabric 130 may be too low, such that the breathable waterproof cloth 100 has a low peeling strength. In some embodiments, the uniformity of the first adhesive layer 120 can be maintained by controlling the rotation speed ratio of the cloth feeding wheel 3 to the first pressing wheel 4. For example, the rotation speed ratio of the cloth feeding wheel 3 to the first pressing wheel 4 may be, for example, 1:1 to control the tension of the first base fabric 130, such that the first adhesive layer 120 is uniformly and smoothly formed on the surface of the first base fabric 130.

Next, step S60a is proceeded to guide the first base fabric 130 with the first adhesive layer 120 and the breathable and waterproof non-woven fabric 110 to be between the first pressing wheel 4 and the second pressing wheel 5, and position the first adhesive layer 120 to be between the first base fabric 130 and the breathable and waterproof non-woven fabric 110.

Then, step S70a is proceeded to press the breathable and waterproof non-woven fabric 110 onto the surface of the first base fabric 130. As mentioned above, the first pressing wheel 4 has the first rotation direction, and the second pressing wheel 5 has the second rotation direction. By configuring the first pressing wheel 4 and the second pressing wheel 5 to have different rotation directions, the breathable and waterproof non-woven fabric 110 can be pressed to the surface of the first base fabric 130 through the first adhesive layer 120. The distance between the first pressing wheel 4 and the second pressing wheel 5 of the present disclosure is about 50% to 70% of the thickness of the semi-finished product, such that the breathable and waterproof non-woven fabric 110 and the first base fabric 130 have good pressure strength.

In detail, if the distance between the first pressing wheel 4 and the second pressing wheel 5 is less than 50% of the thickness of the semi-finished product, it may cause adhesion leakage, thereby affecting the configuration of the adhesion dots 122; if the distance between the wheel 4 and the second pressing wheel 5 is greater than 70% of the thickness of the semi-finished product, the breathable and waterproof non-woven fabric 110 and the first base fabric 130 may not be firmly pressed against each other, thereby affecting the stability of the breathable and waterproof cloth 100. In some embodiments, the rotation speed ratio of the first pressing wheel 4 and the second pressing wheel 5 may be, for example, 1:1 to control the respective tension of the breathable and waterproof non-woven fabric 110 and the first base fabric 130, such that the breathable and waterproof cloth 100 has good flatness. In some embodiments, the temperature of each of the first pressing wheel 4 and the second pressing wheel 5 can be between room temperature and 170° C., such that the bonding device 1000 and the bonding method of the present disclosure are suitable for the bonding process of fabrics of various materials.

After completing the above steps S10a to S70a, the semi-finished can be formed. By using the bonding device 1000 and bonding method of the present disclosure to fabricate the breathable waterproof cloth 100, the first adhesive layer 120 can be accurately formed on the first base fabric 130, and the amount of adhesive AD can be precisely controlled In order to control the thickness and uniformity of the first adhesive layer 120. Accordingly, the breathable and waterproof cloth 100 has good air permeability, waterproofness, and peeling strength.

Please return to FIG. 1. In some embodiments, the breathable and waterproof cloth 100 may further include a second adhesive layer 140, which is disposed on the second surface 113 of the breathable and waterproof non-woven fabric 110 facing away from the first surface 111. In some embodiments, the second adhesive layer 140 may be disposed on an entire surface of the second surface 113 of the breathable and waterproof non-woven fabric 110, thereby facilitating manufacturing convenience and providing good adhesion. In some embodiments, the second adhesive layer 140 may be, for example, a moisture-curing reactive hot-melt adhesive to provide a strong adhesive force and a high curing rate. In some embodiments, the second adhesive layer 140 can be formed on the second surface 113 of the breathable and waterproof non-woven fabric 110 by coating at a temperature of 110° C. to 130° C., and a viscosity of the second adhesive layer 140 at a temperature of 90° C. is between 8000 cP and 9000 cP. Thereby, the second adhesive layer 140 can be easily transferred to the breathable and waterproof non-woven fabric 110, and the thickness of the second adhesive layer 140 can be well controlled. In detail, if the viscosity of the second adhesive layer 140 at a temperature of 90° C. is less than 8000 cP, the thickness of the second adhesive layer 140 may not be easily controlled due to its high fluidity; if the viscosity of the second adhesive layer 140 at a temperature of 90° C. is greater than 9000 cP, the second adhesive layer 140 may be too viscous to transfer to the breathable and waterproof non-woven fabric 110.

In some embodiments, the breathable and waterproof cloth 100 may further include a second base fabric 150, which is disposed on the second surface 113 of the breathable and waterproof non-woven fabric 110 through the second adhesive layer 140. In other words, the second base fabric 150 and the first base fabric 130 are respectively disposed on two opposite surfaces of the breathable and waterproof non-woven fabric 110 respectively through the second adhesive layer 140 and the first adhesive layer 120. In some embodiments, since the second adhesive layer 140 is configured in a whole-surface configuration, the second base fabric 150 may be, for example, a woven fabric with low weaving density, and when the breathable and waterproof cloth 100 is applied to the field of wearing clothing, the second base fabric 150 may be configured as an inner cloth of clothing.

In the following description, the breathable and waterproof cloths of various embodiments of the present disclosure will be listed for various tests to verify the efficacy of the present disclosure. The relevant description of the breathable and waterproof cloth of each embodiment is shown in Table 5.

TABLE 5

|  | first base fabric | first adhesive layer | breathable and waterproof non-woven fabric | second adhesive layer | second base fabric |
|---|---|---|---|---|---|
| embodi-ment 5 | knitted fabric (20 D) | diameter of adhesion dot: 100 μm distribution density of adhesion dot: 9 pcs/mm² | average fiber diameter of melt-blown fiber ≤800 nm | base weigh: 7 gsm | woven fabric (10 D) |
| embodi-ment 6 |  |  |  | base weigh: 14 gsm |  |
| embodi-ment 7 |  |  |  | base weigh: 21 gsm |  |
| embodi-ment 8 |  |  |  | base weigh: 28 gsm |  |
| embodi-ment 9 |  |  |  | base weigh: 42 gsm |  |

In this experiment, the air permeability, waterproofness, and moisture permeability of the breathable and waterproof cloth of each embodiment are measured. It should be understood that the air permeability is measured by the method ASTM-D737; the waterproofness is measured by the method CNS10460 L3201B; the moisture permeability is measured by the method JIS L1099. The results are shown in Table 6.

TABLE 6

|  | air permeability (cfm) | waterproofness (mmH$_2$O) | moisture permeability (g/(m$^2$*24 hr) |
|---|---|---|---|
| embodi-ment 5 | 0.8 ± 0.08 | 1850 | 39016 |

TABLE 6-continued

|  | air permeability (cfm) | waterproofness (mmH$_2$O) | moisture permeability (g/(m$^2$*24 hr) |
|---|---|---|---|
| embodi-ment 6 | 0.8 ± 0.08 | 2200 | 38054 |
| embodi-ment 7 | 0.6 ± 0.05 | 3450 | 35339 |
| embodi-ment 8 | 0.6 ± 0.05 | 6900 | 32935 |
| embodi-ment 9 | 0.7 ± 0.01 | 8750 | 23815 |

It can be seen from the results that the breathable and waterproof cloth of each embodiment can have good air permeability and waterproofness. When the base weigh of the second adhesive layer is larger, the breathable and waterproof cloth of each embodiment can have better waterproofness. Furthermore, in addition to air permeability and waterproofness, the breathable and waterproof cloth of each embodiment can also have good moisture permeability, so as to prevent the entry of moisture from the external environment and help release moisture on the surface of the human body, thereby providing the user with a good wearing comfort.

According to the aforementioned embodiments of the present disclosure, since the breathable and waterproof cloth of the present disclosure includes a breathable and waterproof non-woven fabric manufactured by a melt-blowing process, the breathable and waterproof non-woven fabric can have good water pressure resistance, thereby providing the breathable and waterproof fabric with good waterproofness. In addition, since the melt-blown fiber in the breathable and waterproof non-woven fabric has a water repellent with suitable size, it can provide the breathable and waterproof non-woven fabric with good water repellency. Furthermore, through the special configuration of the adhesive layer in the breathable and waterproof cloth and the matching between the adhesive layer and the base fabric, the breathable and waterproof cloth can have good air permeability. On the other hand, the breathable and waterproof cloth of the present disclosure has been tested and shown to have good moisture permeability, thereby providing the user with a good wearing comfort.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method of a breathable and waterproof non-woven fabric, comprising:
    performing a kneading process on 87 to 91 parts by weight of a polyester, 5 to 7 parts by weight of a water repellent, and 3 to 6 parts by weight of a flow promoter, such that a mixture is formed, wherein the polyester has a melt index between 350 g/10 min and 1310 g/10 min at a temperature of 270° C., and the mixture has a melt index between 530 g/10 min and 1540 g/10 min at a temperature of 270° C., the water repellent comprises a silicon dioxide aerogel, and the silicon dioxide aerogel has a spherical shape; and performing a melt-blowing process on the mixture, such that the flow promoter is volatilized and a melt-blown fiber is formed, wherein the melt-blown fiber has a fiber body and the water repellent, and the water repellent is disposed on the fiber body.

2. The manufacturing method of the breathable and water-proof non-woven fabric of claim 1, wherein a temperature of the melt-blowing process is between 250° C. and 275° C.

3. The manufacturing method of the breathable and water-proof non-woven fabric of claim 1, wherein the flow pro-moter comprises 0.1 to 6.0 parts by weight of a slip agent and 0.1 to 6.0 parts by weight of a polyol.

4. The manufacturing method of the breathable and water-proof non-woven fabric of claim 3, wherein the polyol comprises ethylene glycol, propylene glycol, butylene gly-col, polyethylene glycol, or combinations thereof.

5. The manufacturing method of the breathable and water-proof non-woven fabric of claim 1, further comprising:

receiving a plurality of the melt-blown fiber, and performing a calendering process on the plurality of the received melt-blown fiber, such that the breathable and waterproof non-woven fabric is formed.

* * * * *